United States Patent [19]

Graham

[11] 4,005,428

[45] Jan. 25, 1977

[54] SECURE REMOTE CONTROL COMMUNICATION SYSTEMS

[75] Inventor: Jerry P. Graham, Fairfax, Va.

[73] Assignee: Sound Technology, Inc., Enfield, Conn.

[22] Filed: May 15, 1975

[21] Appl. No.: 577,876

[52] U.S. Cl. .................................. 343/228; 325/37; 325/64; 340/171 A

[51] Int. Cl.[2] .......................................... H04B 7/00

[58] Field of Search ..... 340/171 R, 171 A, 171 PF, 340/167 R; 343/225, 228; 325/37, 39, 55, 64, 141, 142; 179/41 A, 84 SS, 18 EB

[56] References Cited

UNITED STATES PATENTS 3,906,348 9/1975 Willmott .............................. 325/37

*Primary Examiner*—Alvin H. Waring

[57] ABSTRACT

Coded messages, for use in the remote control of equipment for example, are transmitted and received in a manner in which substantially precludes unauthorized or accidental activation of a control associated with the receiving means. This secure communication is accomplished by generation of a plurality of carrier frequencies in a predetermined sequence and by the modulation of each carrier frequency in accordance with a digital code. The receiving means, which is initially tuned to receive the first carrier in a transmission sequence, detects and decodes the received signals and stores the decoded message whereby equipment to be controlled may be responsive to the entire received message; the receiver being retuned to another carrier after each bit of a coded message is detected.

20 Claims, 3 Drawing Figures

SECURE REMOTE CONTROL COMMUNICATION SYSTEMS

BACKGROUND OF THE INVENTION

1. Field of the Invention

The present invention relates to "private" remote control or communication systems of the type which may be employed to accomplish any of a plurality of functions at a controlled or satellite station in response to command signals radiated from a remotely located transmitter. More specifically, this invention is directed to the sequential transmission of a plurality of signals of different carrier frequency with modulation which varies in accordance with an operator selected code and the reception and decoding of the thus transmitted signals for the purpose of enabling or otherwise controlling the operation of equipment located at a remote receiver station. Accordingly, the general objects of the present invention are to provide novel and improved apparatus and methods of such character.

2. Description of the Prior Art

Multichannel remote control systems are well known in the art. U.S. Pat. No. 3,831,175, assigned to the assignee of the present invention, discloses a multichannel remote control of exceptional utility.

All remote control systems employing communications techniques, and particularly those which employ radio transmission, have been characterized by a certain degree of lack of security. This lack of security may, considering a very basic utilization of such systems, appear as inadvertent and/or unauthorized opening of garage doors or turning on of lights. In terms of more serious consequences, the interfering with a remote control system can result in such dire consequences as a detonation of explosives at an improper time and the connecting or disconnecting of important machinery to a power source at an inappropriate time.

Previous attempts to safeguard the privacy of transmission and reception of control signals have included complicated circuitry which will prevent the remote receiver from acting in response to spurious signals; such spurious signals either being in the form of "noise" or resulting from a deliberate attempt to exercise unauthorized control over equipment. Such prior art efforts to protect the privacy of remote control systems, to the limited extent that they have achieved the desired result of security, have been comparatively expensive and, due to circuit complexity, shomewhat lacking in reliability.

An additional consideration in remote control apparatus, particularly where the frequency spectrum employed by the apparatus is shared with other users, is to minimize transmission time and thus minimize interference with the transmissions of such other users; the other users typically transmitting on a single carrier frequency. Previous efforts to conserve the frequency spectrum and to minimize interference have, as in the case of prior attempts to enhance privacy, resulted in complicated and thus expensive circuitry.

A further and serious disadvantage of prior art remote control systems resides in the fact that changing of the transmitted "code" is, when possible at all, a difficult and comparatively time consuming task. There are numerous applications where the transmitter operator may desire to transmit a different code depending upon the immediate circumstances. By way of example, a police officer may wish to individually remotely turn on lights in commercial buildings for a brief period during patrol, each store being responsive to a separate code, and the officer may also wish to be able to "dial" a still further code indicating a need for assistance. All such transmissions should, of course, be "private" and not subject to jamming.

SUMMARY OF THE INVENTION

The present invention overcomes the above briefly described and other deficiencies and disadvantages of the prior art by providing a novel and improved remote control system characterized by an exceptional degree of security and privacy. In accordance with the invention, a plurality of carrier frequencies are generated in a predetermined sequence. These carrier frequencies, prior to transmission, are modulated. The modulating information is commensurate with a digital code, for example either a binary code or N-ary code, and the particular modulation to be imposed on each of the sequentially generated carriers is selected by the operator. Thus, a digitally coded message may be transmitted in the form of a plurality of sequentially radiated carriers with each carrier having modulation imposed thereon.

The invention also contemplates a receiver which is initially tuned to receive the first carrier in the transmission sequence. The receiver demodulates the carrier and provides a decoded output commensurate with the detection of modulation corresponding to the binary information. Upon detection of a first bit of a coded message, the decoded bit of binary information will be stored and receiver will be tuned to the second carrier in the transmission sequence. The detection and retuning mode will be repeated until a complete message has been received. Upon receipt of a complete message an end-of-message signal will be generated and will cause the stored binary information commensurate with the entire message to be loaded into a storage device whereby it is available at the receiver for exercising control over apparatus at the receiver station.

BRIEF DISCUSSION OF THE DRAWING

The present invention may be better understood and its numerous objects and advantages will become apparent to those skilled in the art by reference to accompanying drawing wherein:

FIG. 1 is a block diagram of a first embodiment of a transmitter in accordance with the present invention; and FIGS. 2A and 2B are a block diagram of a receiver intended for use with the transmitter of FIG. 1.

DESCRIPTION OF THE PREFERRED EMBODIMENT

Figure 1:
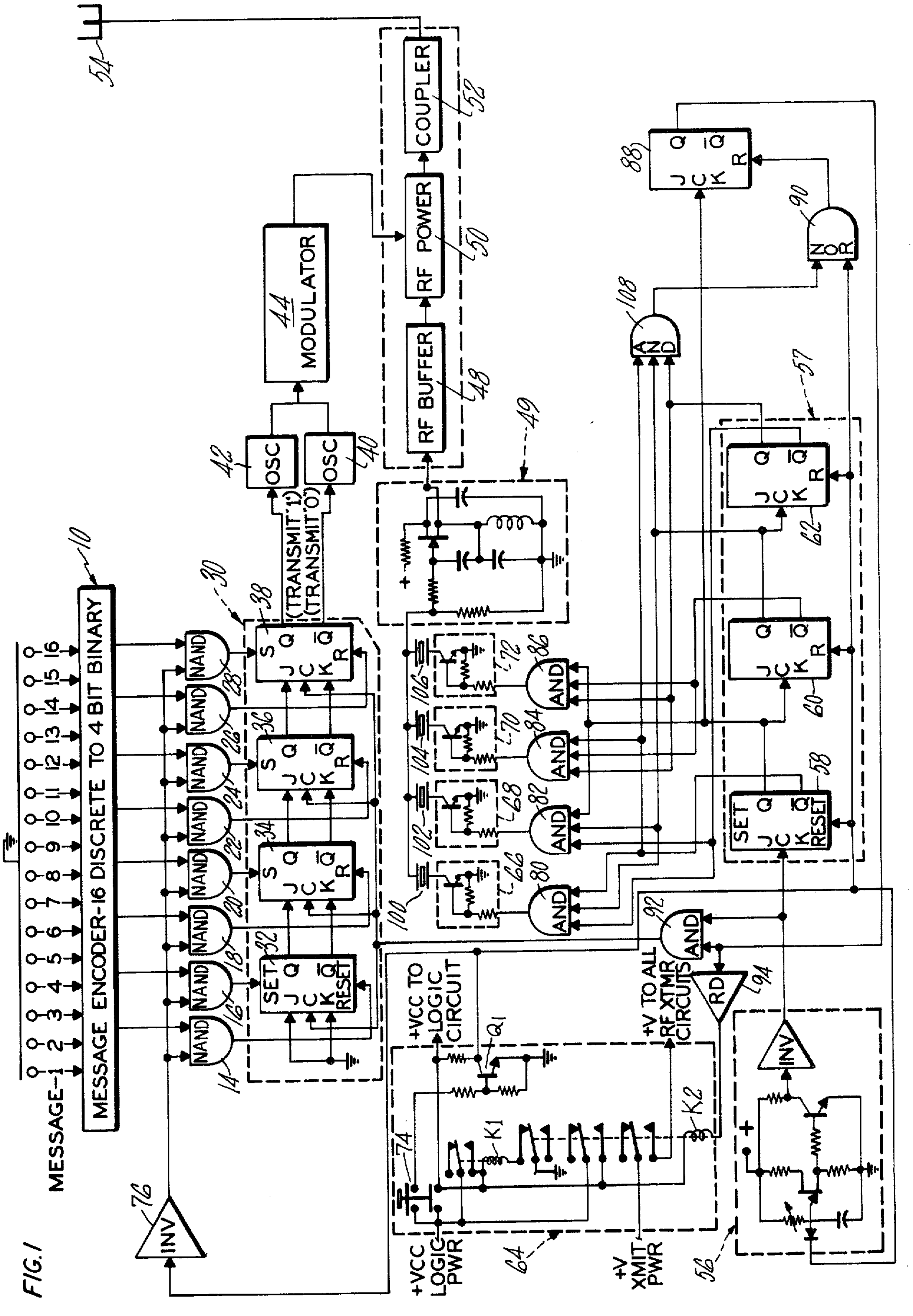

With reference now to FIG. 1, a transmitter in accordance with a preferred embodiment of the invention is depicted in block diagram form. An information bearing input for the transmitter is derived from a message selector switch indicated schematically and generally at 10. The message selector switch may, in the disclosed embodiment, be set to any one of sixteen positions; i.e., switch 10 will typically be a multiple position switch. Alternatively, switch 10 may comprise a set of individual push button type switches such as would be found on the keyboard of a miniaturized calculator. The output of switch 10 is applied to the input of a message encoder 12. Message encoder 12 is a commercially available component which may take the form of an integrated circuit or a diode matrix. Message encoder 12 provides, on eight output lines, a four bit binary word commensurate with the position of the message selector switch 10.

The four bit binary word output of message encoder 12 is applied to a logic circuit consisting of eight NAND gates 14, 16, 18, 20, 22, 24, 26 and 28. These NAND gates afford isolation between the encoder and a message shift register 30 and provide, in the manner to be described below, means for loading the selected message into the message shift register at the appropriate time in the transmission sequence.

Message shift register 30, which is also a commercially available component, comprises four bistable circuits 32, 34, 36 and 38. These bistable circuits are master-slave type flip-flop circuits with independent set and reset features such as, for example, Signetics Corporation type SN-7472. The message shift register stores the binary word commensurate with the selected message and permits that word to be shifted out, one bit at a time, under the control of a transmit clock.

The outputs of message shift register 30 are applied as inputs to a pair of gated oscillators 40 and 42. In accordance with one implementation of the invention, oscillator 40 was a "low" frequency oscillator operating at 10 Hz whereas oscillator 42 was a "high" frequency oscillator operating at 20 Hz. such gated oscillators are well known in the art. Oscillator 40 is gated so as to provide an output signal to a modulator 44 in response to a "1" appearing at the $\overline{Q}$ output of flip-flop 38 of the shift register whereas oscillator 42 is gated to provide a signal to modulator 42 in response to a "1" appearing at the Q output of flip-flop 38. In terms of a transmitted binary code, the output frequency of oscillator 42 may be considered a "1" and the output frequency of oscillator 40 a "0". In the disclosed embodiment modulator 44 is a conventional amplitude modulator which amplifies the selected oscillator output signal and applies it as a modulating input to the power amplifier stage of an RF transmitter; the transmitter having been indicated generally at 46. It would, of course, be within the capabilities of one skilled in the art to employ phase or frequency modulation.

The transmitter 46 is of conventional construction and comprises a buffer amplifier 48. The input to buffer 48 is derived from a conventional crystal controlled oscillator indicated generally at 49. The output frequency of oscillator 49 is variable in the manner to be described below. The output of buffer 48 is applied to RF power amplifier 50 where it is modulated by the output of modulator 44. The output of RF power amplifier 50 is applied, via a standard antenna coupling circuit 52, to the transmitting antenna 54.

The transmitter in accordance with the disclosed embodiment of the present invention also includes a gated clock pulse generator indicated generally at 56. Clock pulse generator 56 is a unijunction transistor oscillator circuit of a type well known in the art. The output of clock pulse generator 56 controls, in the manner to be described below, the operation of message shift register 30 and a binary counter 57 comprising flip-flop circuits 58, 60 and 62. The transmitter further includes a power control and reset circuit which has been indicated generally at 64. A reset output from power control circuit 64 controls, in the manner to be described below, the operation of clock pulse generator 56; the clock pulse generator 56 being free running when in the enabled state. The transmitter additionally includes a plurality of further bistable and gating circuits, which will be discussed during a description of operation, and four crystal selector switches 66, 68, 70 and 72.

It is believed the construction of the transmitter of FIG. 1 will best be understood by those skilled in the art from a description of the operation thereof. It will be presumed that there is initially no power applied to the transmitter and the selector switch 10 has been positioned so as to select the coded message the operator desires to transmit. Prior to the closing of a "transmit" switch 74 in power control and reset circuit 64 the state of the transmitter logic may be considered to be indefinite. The closing of switch 74 applies DC power to the transmitter logic. Additionally, the momentary closing of switch 74 causes transistor Q1, included within the power control and reset circuit 64, to be turned on whereby the collector voltage of Q1 falls. Accordingly, a reset signal, in the form of the negative going trailing edge of a pulse, will appear at the collector of Q1. This reset signal is delivered to the reset input terminals of flip-flops 58, 60 and 62 of counter 57 and to the reset input of a "transmit-enable" flip-flop 88. The reset signal from power control circuit 64 is also applied, via an inverter 76, to the NAND gates 14–28 thereby strobing the selected message into message shift register 30. As a final function, the reset output from the power control and reset circuit 64; i.e., the collector voltage of Q1 while in the conductive state; is utilized to hold the gated clock pulse generator 56 in the off condition.

It is to be noted that DC power is initially applied to the transmitter logic circuitry via a first pair of normally open contacts of "transmit" switch 74. Base drive for "reset" transistor Q1 in the power control circuit 64 is supplied via a second pair of normally open contacts of switch 74. The momentary closing of switch 74, which occurs when the operator depresses a "transmit" actuator button for the switch, will result in current flow through the solenoid of a relay K1. Accordingly, almost instantaneously after operation of the actuator for "transmit" switch 74, relay K1 will be energized. Relay K1 is self-latching since one end of its solenoid is connected to ground via a pair of normally closed contacts of a second relay K2. Thus, upon release of the actuator for "transmit" switch 74, power will remain applied to the transmitter logic circuits. However, base drive will be removed from transistor Q1 and the reset pulse generator will thus return to its nonconductive or "off" state.

To summarize the above-described operation, the depression of the actuator button of "transmit" switch 74 results in the application of power to the logic circuitry and the generation of a reset signal which initializes the system by resetting the been employed flip-flop circuits of the message shift register 30, the binary counter 57 and the transmit-enable circuit 88. In addition, the reset signal results in a four bit binary word being loaded from message encoder 12 into the message shift register 30 via NAND gates 14–28. During the time the transmitter logic is being initialized, the clock pulse generator 56 is held in the "off" condition. Upon release of the actuator for "transmit" switch 74, due to the self-latching action of relay K1, DC power will remain applied to the logic circuits but the disabling signal will be removed from clock pulse generator 56. Accordingly, the clock pulse generator 56 will begin to provide output pulses; a one pulse per second repetition rate having been-employed in one implementation of the invention.

The resetting of flip-flop circuits 58, 60 and 62 of binary counter 57 initializes the counter to the 000 output state; i.e., no output or a "0" will appear on the Q output terminals of flip-flops 58, 60 and 62. It is to be noted that the flip-flops employed in the disclosed embodiment of the invention are responsive to the trailing edges of received positive pulses. The first clock pulse from pulse generator 56, the clock generator output being applied to the control input of flip-flop 58, will cause the switching of circuit 58 whereby binary counter 57 will assume a state commensurate with an output count of 001. Upon receipt of a second clock pulse flip-flop 58 will be returned to its initial state and, in response to the Q output of flip-flop 58 falling, flip-flop 60 will be switched so as to provide a "1" at its Q output and the binary counter will assume the 010 state. As may be seen from FIG. 1, the 010 state of binary counter 57 results in the enabling of a first AND gate 80 of a decoding circuit comprising AND gates 80, 82, 84 and 86. Additionally, the switching of flip-flop 58 by the second clock pulse causes the switching of transmit-enable flip-flop 88. As noted above, flip-flop 88 will have been reset, via NOR gate 90, by the reset output provided by the power control circuit 64 upon initial depression of the actuator for "transmit" switch 74. The switching of tansmit-enable flip-flop 88 causes a "1" to appear at the Q output of this bistable circuit and this "1"; i.e., a positive potential; will be applied as an enabling input to a shift pulse control AND gate 92 and as a control signal to bias a driver amplifier 94 into the conductive state. The conduction of amplifier 94 will cause current to flow through the solenoid of relay K2. Relay K2 is a make-before-break relay having three sets of contacts. The first of the contacts of relay K2; i.e., normally open contacts A, is employed for coupling the transmitter RF circuits to a source of DC power. It is generally considered desirable to employ separate sources of power for the logic and RF circuits and the transmitter RF and logic sections will typically operate at different voltage levels. The second set of contacts of relay K2; i.e., normally open contacts B; apply power to the transmitter logic circuits when closed. The third set of normally closed contacts C of relay K2 are, as noted above, in the holding circuit of relay K1 and thus, when relay K2 is energized, relay K1 will be de-energized. However, the closing of contacts B of relay K2 occurs before the opening of the contacts C and thus there will be no interruption in the application of power to the transmitter logic circuits. In the manner to be described below, the removal of drive current for the solenoid of relay K2 at the end of the transmitting sequence will remove all power from the transmitter.

As pointed out above, the binary counter 57 is in the 010 state subsequent to receipt of the second clock pulse from pulse generator 56 and AND gate 80 is enabled. The enabling of gate 80 results in the closing of crystal selector switch 66 which has been shown schematically as comprising a normally non-conductive transistor having its base connected to the output of gate 80. It will be understood that either electronic or electromechanical devices can be employed as the crystal selector switches 66–72. The "closing" of switch 66 places a first transmit crystal 100 in the circuit of crystal oscillator 49 whereby oscillator 49 will provide an output signal at a first frequency to RF buffer amplifier 48 in the transmitter section 46.

Presuming that the code selected by message selector switch 10 consists of a binary word having "1" as its first bit, at the time power is applied to the transmitter RF sections flip-flop 38 in shift register 30 will be applying an enabling signal to gated oscillator 42 and a modulating signal at a first frequency, 20 Hz in the example being described, will be applied via modulator 44 to RF power amplifier 50. Thus, the first information transmitted will be a signal commensurate with the frequency determined by crystal 100 as modulated by the output of one of a pair of gated oscillators, oscillator 42 providing the modulation in the example being explained. As noted above, the output of transmit-enable flip-flop 88 will have enabled the shift pulse AND gate 92. Accordingly, the next clock pulse; i.e., the third pulse provided by clock pulse generator 56; will cause the data stored in message shift register 30 to be shifted one position to the right. Simultaneously, the binary counter 57 will be reconfigured in such a way that the enabling signal will be removed from the decoding gate 80 and applied to AND gate 82. Accordingly, crystal switch 66 will be "opened" and crystal switch 68 will be "closed" whereby crystal 100 will be removed from the oscillator circuit and will be replaced by crystal 102. Thus, oscillator circuit 49 will provide a signal at a second frequency, as determined by crystal 102, to RF buffer amplifier 48. This second crystal signal will be modulated, in amplifier 50, by an output signal from either of gated oscillators 40 or 42 as selected by the second bit of the binary word which has been stored in message shift register 30. This procedure will continue until each of crystals 100, 102, 104 and 106 has been sequentially placed in the circuit of oscillator 49 of the thus generated RF signal has been modulated by a low frequency signal from a gated oscillator selected in accordance with the message stored in the message shift register 30.

When the binary counter has been counted to the 100 state, by the 6th clock pulse, an "end transmit" AND gate 108 will be enabled. The output of gate 108 is applied, via NOR gate 90, to the reset input of transmit-enable flip-flop 88 causing flip-flop 88 to be reset. Resetting of flip-flop 88 removes the enabling input from shift pulse AND gate 92 and the positive bias from relay driver amplifier 94. Amplifier 94 will, accordingly, cease conducting and relay K2 will drop out thus removing all power from the transmitter.

Figure 2A:
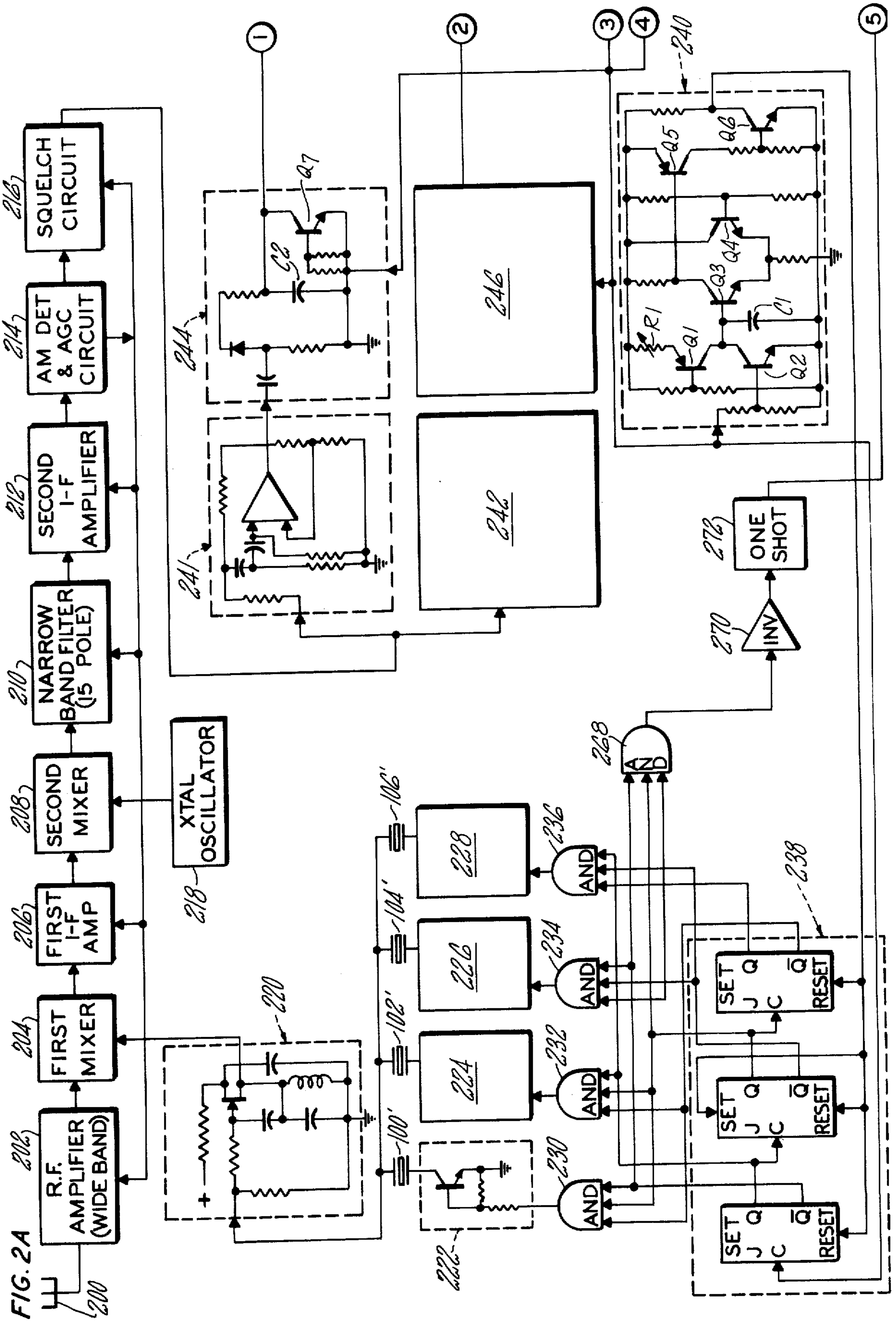
Figure 2B:
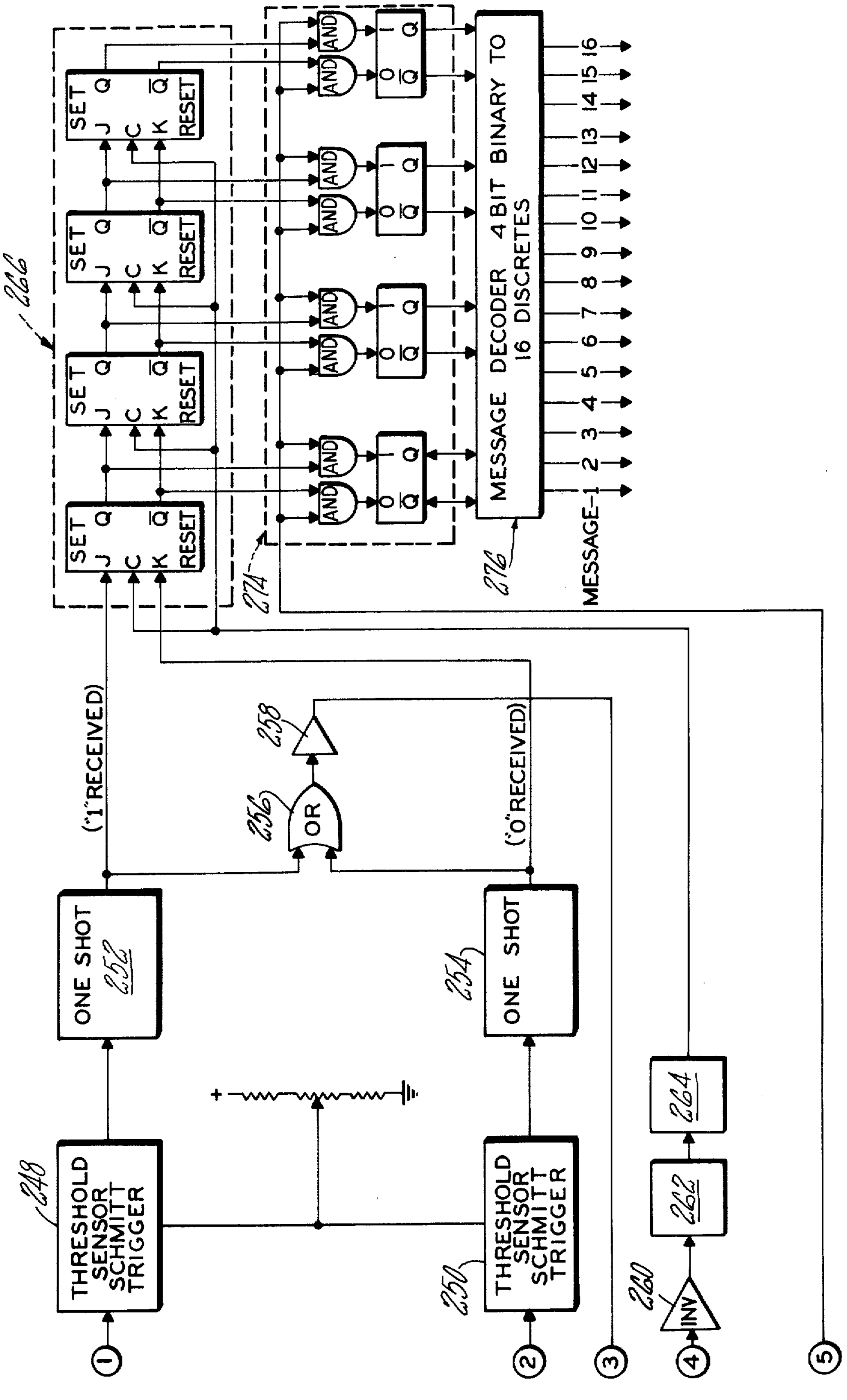

Referring now to FIGS. 2A and 2B, a receiver designed for use with the transmitter of FIG. 1 is shown in block diagram form. The receiver comprises, coupled to a receiving antenna 200, a conventional double conversion superheterodyne type receiver. The receiver includes a wide band RF amplifier 202, a first mixer 204, a first intermediate frequency amplifier 206, a second mixer 208, a band pass filter 210, a second IF amplifier 212, a detector and automatic gain control circuit 214 and a squelch circuit 216. The receiver also includes a crystal controlled oscillator 218 having its output connected to a second mixer 208. The detector 214 will, of course, be commensurate with the type of modulation employed.

The receiver of FIG. 2 also employs a crystal oscillator circuit 220 having its output connected to first mixer 204. Crystal oscillator circuit 220 may be identical to the crystal oscillator 49 of the transmitter. Crystals are switched into the circuit of oscillator 220 by means of crystal selector switches 222, 224, 226 and 228. The crystal selector switches 222-228 may be identical to crystal selector switches 66–72 of the receiver. The crystal selector switches will, in sequence, connect crystals 100', 102', 104' and 106' into the circuit of oscillator 220; there being four crystals in the embodiment being disclosed and the receiver crystals being matched to the transmitter crystals but separated in frequency by the receiver IF center frequency. The operation of the crystal selector switches 222–228 is controlled in the same manner as the similar selector switches in the transmitter by means of four AND decoding gates 230, 232, 234 and 236 which are enabled in the proper sequence by the outputs of a binary counter indicated generally at 238. Counter 238, like its counterpart binary counter 57 in the transmitter, comprises three flip-flop circuits.

When the receiver is in use power will be applied thereto at all times. Accordingly, counter 238 will be held, prior to the receipt of an information bearing input signal, in the 010 state by a reset signal generated by an exces time detector which has been indicated generally at 240. With counter 238 in the 010 state, the AND gate 230 will be enabled, switch 222 will be "closed" and crystal 100' will be connected in the circuit of oscillator 220. Accordingly, the receiver will be in condition to receive a modulated signal at a frequency determined by crystal 100'.

Continuing with a description of the receiver, the detector 214 will detect any received signal and, when the AGC voltage level becomes sufficiently high, it will cause the squelch circuit 216 to become disabled in the manner well known in the art. Upon disabling of squelch circuit 216, the received and detected signals will be applied to the inputs of a pair of active filters 241 and 242. The active filters, one of which has been shown schematically, will comprise circuits of identical configuration but with passive elements selected so as to pass only a narrow band of frequencies surrounding the frequency of interest. The frequencies of interest will, of course, be those frequencies generated by gated oscillators 40 and 42 of the transmitter. It will be recalled that the transmitter of the embodiment disclosed employed oscillators which operated at frequencies of 10 Hz and 20 Hz. These audio range frequencies were selected since they rarely occur during voice transmission. It will, of course, be understood that any frequencies, either higher or lower than those established by the crystal controlled oscillators, may be utilized. Active filters such as filters 241 and 242 are commercially available components.

The output signals from filters 241 and 242 are respectively applied to detector circuits 244 and 246. In the manner known in the art, the detectors rectify the signals passed by the filters and, considering detector 244 which has been shown schematically, the rectified output of filter 241 is employed to charge capacitor C2. The outputs of detectors 244 and 246 are respectively applied to the inputs of threshold sensor circuits 248 and 250. The threshold sensors 248 and 250, in accordance with a preferred embodiment, will comprise Schmidt trigger circuits. Considering again detector 244, when the voltage across capacitor C2 reaches a sufficiently high level, Schmidt trigger 248 will be fired. The outputs of Schmidt triggers 248 and 250 will respectively gate one shot multivibrators 252 and 254. Thus, the conduction of the threshold sensors, and the subsequent gating of the one shot multivibrators, will be indicative of the fact that a signal at the frequency to which one of filters 241 and 242 is tuned and of sufficient duration to be an information bearing output from the transmitter has been received.

Before discussing the operation of the logic circuitry which receives and processes the output pulses provided by multivibrators 252 and 254, the operation of excess time detector 240 will be explained. Under steady state conditions with no input signal being received for the transmitter of FIG. 1, the input transistor Q2 of excess time detector 240 is nonconductive while transistor Q1 is conducting at a level determined by the setting of potentiometer R1. Accordingly, capacitor C1, which is connected between the collectors of Q1 and Q2 and ground, will be charged at a rate as determined by potentiometer R1. Capacitor Cl is also connectd to the base of normally nonconductive transistor Q3; transistor Q3 forming with transistor Q4 a differential amplifier. If the charge on C1 becomes sufficiently high to bias the diferential amplifier into the conductive state, transistor Q5 will also be turned on and, in turn, will turn on transistor Q6. Conduction of transistor Q6 will "pull down" the output or reset line from excess time detector 240 and the negative going signal will cause the resetting of binary counter 238. Positive pulses delivered to the input of excess time detector 240, and applied to the base of input transistor Q2, will bias transistor Q2 into a conductive state. Conduction of transistor Q2 will establish a discharge path to ground for the charge on capacitor C1. Thus, it may be seen that the excess time detector 240 will generate a reset pulse only when the time interval between receipt of positive input pulses is greater than a preselected value as established by the setting of potentiometer R1. If the time between positive pulses applied to excess time detector 240 is less than the preselected time, the charge on capacitor C1 will be repetitively "dumped" through transistor Q2 and the generation of a reset signal will not be triggered. To briefly recapitulate the discussion above, prior to receipt of an input signal which will be passed by either of filters 241 or 242 after processing in the RF section of the receiver, capacitor C1 will be charged to the conduction level of transistor Q3 and a reset signal will be applied to the flip-flop circuits of binary counter 238. The binary counter will, accordingly, be held in the 010 state so as to enable AND gate 230 and thereby cause the "closing" of switch 222 and the connection of crystal 100' into the circuit of oscillator 220. The receiver will, as noted above, thus initially (under steady state conditions) be enabled to receive and demodulate a signal at a first frequency as determined by crystal 100'.

The positive pulses which are applied to excess time detector 240 to prevent the generation of a reset signal during the time a message is being received are derived from the outputs of one shot multivibrators 252 and 254. The outputs of both of these multivibrators are connected to an OR gate 256 and signals passed by the OR gate are applied as inputs to a buffer amplifier 258. The output of buffer 258 is applied as the input to excess time detector 240. The positive pulses provided at the output of buffer 258 are also applied as clamp inputs to detectors 244 and 246, as will be described in detail below, and as counting control pulses for binary counter 238. Finally, the positive pulses from buffer 258 are applied as the input to an inverter 260. Inverter 260 delivers trigger pulses to a one shot multivibrator 262 which, in turn, triggers a further one shot multivibrator 264. The function of inverter 260, multivibrator 262 and multivibrator 264 is to provide a delay which will insure that the information contained in the outputs of one shot multivibrators 252 and 254 is available at the input to a message shift register 266 prior to the time a signal is generated which will cause the information to be loaded into a first multivibrator of the message shift register; the message input strobing pulse being provided by the output of multivibrator 264. Commensurate with the configuration of the transmitter, the generation of a pulse by multivibrator 252, commensurate with the receipt of a carrier modulated with a 20 Hz signal, will correspond to a received "1" whereas an output from multivibrator 254, indicative of the receipt of a carrier modulator with a 10 Hz signal, will be commensurate with a received "0" of the transmitted binary code word.

If it is presumed that the first bit of information transmitted corresponds to a "1", modulated on a frequency determined by transmitter crystal 100, the first input to message shift register 266 will be a pulse from multivibrator 252. This same pulse will cause the generation of a delayed message shift pulse by multivibrator 264, will cause the reset signal to be removed from counter 238 and will cause the counter to be stepped forward one count thereby disabling AND gate 230 and enabling AND gate 232. The enabling of AND gate 232 will cause the "closing" of switch 224 and the placing of crystal 102' in the circuit of crystal oscillator 220. Crystal selector switch 222 will, of course, have been "opened" by the disabling of AND gate 230. Thus, the receiver is now configured to receive the second modulated carrier at a frequency determined by crystal 102'. Also, the "1" received as the first bit of the transmitted message will have been loaded into the first flip-flop of message shift register 266 under control of the output pulse provided by multivibrator 264.

The operation of the receiver continues in the manner described above until four bits of information have been loaded into message shift register 266. At this time the message shift register will be in the same state as was shift register 30 of the transmitter prior to initiation of the sending sequence. It should also be noted that, at this time, the one shot multivibrators 252 and 254 will have generated four pulses which are applied to binary counter 238. The counter will thus have stepped such that its output will be 110. This output from binary counter 238 will enable a "message received" AND gate 268. The output of gate 268 is inverted in inverter 270, and applied to the input of a one shot multivibrator 272.

The output of multivibrator 272 is employed to strobe the message from shift register 266 into an output register indicated generally at 274. Thus, the pulse provided by multivibrator 272 is applied as a gating control signal to eight AND transfer gates; the transfer gates being connected to individual of the Q and $\overline{Q}$ outputs of the four flip-flops of message shift register 266. When the transfer AND gates of output message register 274 receive a strobe pulse from multivibrator 272, they will load the message stored in message shift register 266 into four flip-flops in the output message register. While not essential for operation, the output message register 274 enhances the "security" of the system since it will not receive a new message; i.e., will not change state; in the event that only a partial message; i.e., less than four bits of information; has been received and processed by the receiver. Additionally, the output message register will store the previously transmitted message until such time as a complete new message has been received regardless of what occurs in message shift register 266.

The Q and $\overline{Q}$ outputs of the flip-flops of output message register 274 are connected to a four bit binary-to-16 bit discrete message decoder 276. The message decoder 276 consists merely of a plurality of properly interconnected AND gates. Such binary to discrete message decoders are well known in the art. The output from message decoder 276 is applied to the apparatus to be controlled. By way of example, each output of message decoder 276 may be employed to bias on or off a driver amplifier which supplies current for a relay solenoid.

Returning to a discussion of the detectors 244 and 246, it was noted above that the output pulses from buffer 258, indicative of the detection of a bit of a coded message, are applied at clamp inputs to each of the detectors. As may be seen in the case of detector 244, which has been shown schematically, these clamp input pulses are applied to the base of a normally non-conductive transistor Q7 hard on thus providing a discharge path for capacitor C2. Accordingly, after each message bit has been received and identified, the charge on capacitor C2 of the signal detectors 244 and 246 is "dumped" whereby the detector will start off at a zero voltage level subsequent to receipt of each message bit.

As an additional general statement regarding the receiver of FIGS. 2A and 2B, it is to be noted that the initial state of message shift register 266; i.e., the state upon receipt of the first bit of a message transmission, will have no bearing on the operation of the system. It may also be noted that, in one implementation of the invention, the multivibrators 252 and 254 produced an output pulse of 1 millisecond duration, the multivibrators 262 and 272 provided an output pulse of 100 microseconds duration and multivibrator 264 provided an output pulse of 10 microsecond duration.

While a preferred embodiment has been shown and described, various modifications and substitutions may be made thereto without departing from the spirit and scope of the invention. Thus, by way of example, the invention is not limited to the use of any particular number of different carrier frequencies; four separate carrier frequencies having been shown by way of example only. Also, while a crystal controlled oscillator and the switching of individual crystals into the oscillator circuit has been shown, use of a frequency synthesizer is also within the scope of the invention. Accordingly, it is to be understood that the present invention has been described by way of illustration and not limitation.

What is claimed is:

1. A communications system comprising:

means for generating a plurality of carrier frequency signals individually in a preselected sequence;

means for modulating each of said carrier frequency signals in accordance with digitally coded information;

means for transmitting the modulated carriers in the sequence in which generated;

means for receiving the transmitted signals, said receiving means being initially responsive to only the first carrier frequency in the preselected sequence;

means for detecting the presence of modulation on each received carrier frequency signal and for generating a signal commensurate therewith;

means responsive to said signals commensurate with the presence of modulation provided by said detecting means for tuning the receiving means to the next carrier frequency in the preselected sequence; and means responsive to said signals commensurate with the presence of modulation provided by said detecting means for storing a signal commensurate with the nature of the modulation, said storing means retaining the transmitted coded information at the end of a transmitting sequence.

2. The apparatus of claim 1 further comprising:

elapsed time detector means, said time detector means being responsive to said signals commensurate with the presence of modulation provided by said detecting means for generating a reset signal when the period between detection of successive modulated carriers exceeds a predetermined time; and means for delivering said reset signals to said receiving means tuning means whereby said receiving means will be retuned to the first carrier frequency of the preselected sequence in response to the generation of a reset signal.

3. The apparatus of claim 1 wherein said modulating means comprises:

a first oscillator, said first oscillator generating a first modulating signal;

a least a second oscillator, said second oscillator generating a second modulating signal;

a modulator, said modulator being responsive to said modulating signals generated by said oscillator means and to said carrier frequency signals for imposing information on each of said sequentially generated carrier frequency signals in accordance with at least one of said modulating signals;

encoder means, said encoder means generating signals for controlling the delivery of said modulating signals to said modulator in accordance with a preselected sequence; and means for synchronizing the operation of said encoder means with said carrier signal generating means, said synchronizing means providing signals for controlling the application of the modulating signals to said modulator whereby the modulation may be varied with the generation of each different carrier frequency signal.

4. The apparatus of claim 3 wherein said encoder means comprises:

a discrete signal to binary encoder;

means for selecting and applying a discrete signal commensurate with a desired message to said encoder whereby said encoder will provide a binary coded output signal commensurate with said message; and shift register means for storing said binary coded signals provided by said encoder, said shift register means receiving control signals from synchronizing means and serially providing output signals commensurate with each bit of the selected message to said first and second oscillator means.

5. The apparatus of claim 4 wherein said first and second oscillators each comprise:

a gated oscillator, said gated oscillators providing readily distinguishable modulating signals in response to the output signals from said shift register means.

6. The apparatus of claim 3 further comprising:

elapsed time detector means, said time detector means being responsive to said signals commensurate with the presence of modulation provided by said detecting means for generating a reset signal when the period between detection of successive modulated carriers exceeds a predetermined time; and means for delivering said reset signals to said receiving means tuning means whereby said receiving means will be retuned to the first carrier frequency of the preselected sequence in response to the generation of a reset signal.

7. The apparatus of claim 3 wherein said carrier frequency signal generating means comprises:

first variable frequency oscillator means;

means for controlling the output frequency of said first variable frequency oscillator means; and means responsive to the control signals provided by said synchronizing means for causing the output frequency controlling means to vary the output frequency of said first variable frequency oscillator means in stepwise fashion.

8. The apparatus of claim 7 wherein said first variable frequency oscillator means output frequency controlling means comprises:

a plurality of frequency determining means; and wherein said means for causing the output frequency controlling means to vary the output frequency of said first variable frequency oscillator means comprises;

switch means for individually connecting said frequency determining means to said first variable frequency oscillator means; and first logic circuit means for controlling the operation of said switch means in accordance with the numerical position of the carrier frequency in the preselected sequence, said logic circuit means being responsive to the control signals provided by said synchronizing means.

9. The apparatus of claim 7 further comprising:

elapsed time detector means, said time detector means being responsive to said signals commensurate with the presence of modulation provided by said detecting means for generating a reset signal when the period between detection of successive modulated carriers exceeds a predetermined time; and means for delivering said reset signals to said receiving means tuning means whereby said receiving means will be retuned to the first carrier frequency of the preselected sequence in response to the generation of a reset signal.

10. The apparatus of claim 9 wherein said encoder means comprises:

a discrete signal to binary encoder;

means for selecting and applying a discrete signal commensurate with a desired message to said encoder whereby said encoder will provide a binary coded output signal commensurate with said message; and shift register means for storing said binary coded signals provided by said encoder, said shift register means receiving control signals from said synchronizing means and serially providing output signals commensurate with each bit of the selected message to said first and second oscillator means.

11. The apparatus of claim 10 wherein said first and second oscillators each comprise:

a gated oscillator, said gated oscillators providing readily distinguishable modulating signals in response to the output signals from said shift register means.

12. The apparatus of claim 11 wherein said first variable frequency oscillator means output frequency controlling means comprises:

a plurality of frequency determining means; and wherein said means for causing the output frequency controlling means to vary the output frequency of said first variable frequency oscillator means comprises;

switch means for individually connecting said frequency determining means to said first variable frequency oscillator means; and first logic circuit means for controlling the operation of said switch means in accordance with the numerical position of the carrier frequency in the preselected sequence, said logic circuit means being responsive to the control signals provided by said synchronizing means.

13. The apparatus of claim 3 wherein said detecting means comprises:

a first detector, said first detector including:

a first filter, said first filter being tuned to pass a signal commensurate with the output of said first oscillator; and means responsive to signals passed by said first filter for providing an output signal commensurate with the presence on the carrier being transmitted of modulation from said first oscillator; and at least a second detector, said second detector including:

a second filter, said second filter being tuned to pass a signal commensurate with the output of said second oscillator; and means responsive to signals passed by said second filter for providing an output signal commensurate with the presence on the carrier being transmitted of modulation from said second oscillator.

14. The apparatus of claim 13 wherein said means for tuning said receiving means comprises:

variable beat frequency oscillator means;

means responsive to output signals provided by either of said first or second detector output signal providing means for varying the output frequency of said beat frequency oscillator means to vary the frequency to which said receiving means is tuned in stepwise fashion and relative to the numerical position in the preselected sequence of the last received carrier frequency.

15. The apparatus of claim 14 wherein said beat frequency oscillator varying means comprises:

counter means responsive to the output signals of said first and second detector output signal providing means for storing a count commensurate with the number of bits of modulated information received; and means responsive to the count stored in said counter means for changing a circuit constant of said beat frequency oscillator means to vary the output frequency thereof.

16. The apparatus of claim 15 wherein said carrier frequency signal generating means comprises:

first variable frequency oscillator means;

means for controlling the output frequency of said first variable frequency oscillator means; and means responsive to the control signals provided by said synchronizing means for causing the output frequency controlling means to vary the output frequency of said first variable frequency oscillator means in stepwise fashion.

17. The apparatus of claim 15 wherein said encoder means comprises:

a discrete signal to binary encoder;

means for selecting and applying a discrete signal commensurate with a desired message to said encoder whereby said encoder will provide a binary coded output signal commensurate with said message; and shift register means for storing said binary coded signals provided by said encoder, said shift register means receiving control signals from said synchronizing means and serially providing output signals commensurate with each bit of the selected message to said first and second oscillator means.

18. The apparatus of claim 16 wherein said encoder means comprises:

a discrete signal to binary encoder;

means for selecting and applying a discrete signal commensurate with a desired message to said encoder whereby said encoder will provide a binary coded output signal commensurate with said message; and shift register means for storing said binary coded signals provided by said encoder, said shift register means receiving control signals from said synchronizing means and serially providing output signals commensurate with each bit of the selected message to said first and second oscillator means.

19. The apparatus of claim 15 further comprising:

elapsed time detector means, said time detector means being responsive to output signals provided by both of said first and second detector output signal providing means for generating a reset signal when the period between detection of successive modulated carriers exceeds a predetermined time; and means for delivering said reset signals to said counter means whereby said receiving means will be returned to the first carrier frequency of the preselected sequence in response to the generation of a reset signal.

20. The apparatus of claim 18 further comprising:

elapsed time detector means, said time detector means being responsive to output signals provided by both of said first and second detector output signal providing means for generating a reset signal when the period between detection of successive modulated carriers exceeds a predetermined time; and means for delivering said reset signals to said counter means whereby said receiving means will be returned to the first carrier frequency of the preselected sequence in response to the generation of a reset signal.

* * * * *